APPARATUS AND METHOD FOR PRESS MOLDING GLASS ARTICLES

INVENTOR.
RAYMOND J. LIPPMANN
EUSTACE H. MUMFORD
BY W. A. Schaich +
D. T. Innis
ATTORNEYS

Dec. 13, 1966  R. J. LIPPMANN ETAL  3,291,588
APPARATUS AND METHOD FOR PRESS MOLDING GLASS ARTICLES
Filed Dec. 19, 1962  8 Sheets-Sheet 3

INVENTOR.
RAYMOND J. LIPPMANN
EUSTACE H. MUMFORD
BY W. A. Schaich &
D. T. Innis
ATTORNEYS Dec. 13, 1966    R. J. LIPPMANN ETAL    3,291,588
APPARATUS AND METHOD FOR PRESS MOLDING GLASS ARTICLES
Filed Dec. 19, 1962    8 Sheets-Sheet 4

INVENTOR.
RAYMOND J. LIPPMANN
EUSTACE H. MUMFORD
BY W. A. Schaich &
J. J. Innis
ATTORNEYS

FIG. 10

United States Patent Office 3,291,588
Patented Dec. 13, 1966

3,291,588
APPARATUS AND METHOD FOR PRESS MOLDING
GLASS ARTICLES
Raymond J. Lippmann, Toledo, Ohio, and Eustace H. Mumford, Ottawa Lake, Mich., assignors to Owens-Illinois Inc., a corporation of Ohio
Filed Dec. 19, 1962, Ser. No. 245,785
10 Claims. (Cl. 65—75)

This invention relates to a method and apparatus for press forming shallow articles from molten glass. More particularly, this invention relates to a method and apparatus for press forming glass articles from glass at high temperatures and while initially in a very fluid state, thus requiring specialized handling in order to prevent the formation of defects in the finished ware.

Conventional press forming operations contain two features which are detrimental to producing good ware from glass having a temperature-viscosity relationship, such that gobs cannot be formed due to the viscosity being below log 2 when the temperature is maintained above the liquidus. In a normal press forming operation, the vertical distance from the orifice of the feeder spout to the mold is relatively large with distances being up to several feet. No problem is encountered when the glass, at the feeding temperature, has a viscosity of log 2.5 or higher. When dropping fluid glasses having a viscosity less than log 2 through a long distance, gravity accelerates the glass to such a velocity that upon impact with the mold, the glass tends to both splatter and to move, temporarily, up the mold side walls above its normal loading height in the mold. Both of these actions will cause defects in the finished ware. It also has been the practice to move a loaded mold in a horizontal or lateral direction after loading and before pressing. This type of motion produces forces which cause the fluid glass in the mold to move up the mold side wall in certain parts of the mold. Although the glass usually settles back to a level condition in the mold prior to the pressing operation, this action of the glass produces a defect in the finished ware.

With the foregoing in mind, it is an object of this invention to provide a method of handling extremely liquid glass and forming such glass into a finished shape without producing defects.

It is another object of this invention to feed charges of extremely fluid molten glass to the forming mold in such a manner that the glass is not caused to splatter or run up the sides of the mold.

It is a further object of this invention to completely form a glass article without subjecting the glass to horizontal motion relative to the mold prior to its becoming relatively set.

It is a still further object of this invention to provide apparatus for receiving molten glass and pressing the molten glass into a finished article wherein the glass, in its molten or fluid state, is subjected to vertical motions only.

It is an additional object of this invention to provide apparatus for forming glass articles in which a plurality of molds are successively loaded and the articles pressed to final shape in a regular sequence.

Other and further objects will be apparent from the following description taken in conjunction with the attached sheets of drawings wherein:

FIG. 9 is a schematic, sectional view of the table indexing drive.

Figure 1:
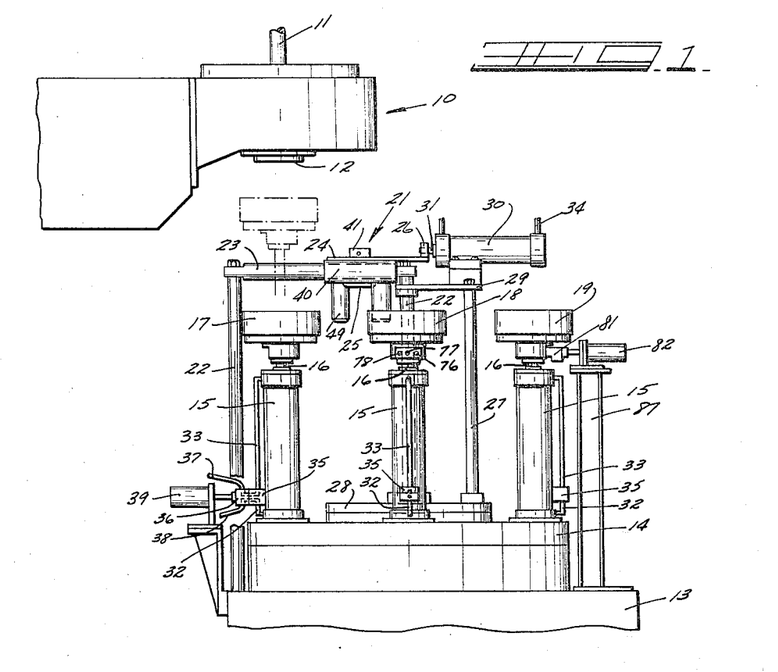
FIG. 1 is a schematic elevational view of the invention.

Referring specifically to FIG. 1, there is shown a feeder 10 which may be of the type disclosed in the copending application S.N. 156,894 filed December 4, 1961, now Patent No. 3,230,060, of Raymond J. Lippmann, a co-inventor in the present application. The feeder 10, as described in the above-referred-to application, is of the type in which molten glass is permitted to flow through an orifice and be periodically cut off by the operation of a plunger 11. The details of the apparatus for raising and lowering the plunger 11 to effect the opening and closing of the orifice 12 is not believed necessary for the proper understanding of this application, it being understood that the plunger or needle 11 will be raised and lowered in sequence for the proper delivery of discrete charges of glass to the forming apparatus.

The forming machine is comprised of a base 13 positioned beneath the feeder 10. The base 13 carries a rotatable table 14 thereabove which is adapted to be indexed 90° during each forming cycle. The table 14 carries on its upper surface, cylinders 15, of which there are four, evenly spaced about the center of the table 14 at 90° intervals. These cylinders are all identical in construction and have piston rods 16 extending therefrom on which are mounted molds 17 to 20. The molds 17 to 20 have cavities therein within which the glass from the feeder 10 is adapted to be placed. Mounted above the molds is a plunger mechanism, generally designated 21, which is supported on the base 13 by four vertical rods 22. These rods support the ends of a pair of parallel guide rails 23 which serve as guides and bearing surfaces for a plunger slide 24. The plunger slide or support generally takes the shape of a flat plate with a plunger head 25 extending therebelow. The details of the plunger will be described later with reference to FIGS. 3 and 5 to 7.

The plunger support 24, adjacent one end, carries an upstanding flange 26 integral therewith. An additional pair of vertical support rods 27, which are fixed to a stationary central portion 28 of the machine, serve to support one end of a horizontal plate 29. The other end of the plate 29 is supported by the vertical rods 22 which are located on the central portion 28 of the machine. The plate 29 serves as the mounting member for a reciprocating fluid motor 30. The fluid motor 30 has a piston rod 31 extending from the end thereof which is fixed to the flange 26 formed on the end of the plunger support 24. In this manner the plunger support 24 is shifted to the dotted line position shown in FIG. 2 and returned to the position shown in full line by the operation of the reciprocating motor 30. It should be noted that the rails 23 are spaced apart a distance sufficient to permit the mold 17 to pass vertically therebetween.

The particular type of glass, the forming of which is the subject of this invention, is extremely fluid, having a viscosity in the range of log 2 to log 2.5 when the temperature necessarily is maintained somewhat above the liquidus. In all situations where molten glass is formed into articles, it is necessary that the feeding temperature of the glass be above the liquidus. Therefore, in those situations where the liquidus temperature is relatively high and results in the viscosity of the glass being at or below log 2 to log 2.5, it is impossible to form gobs in the normal manner. Obviously, the above-referred to viscosity range of log 2 to log 2.5 is not absolute quantity from the standpoint that other variables such as mold charge weight and orifice diameter enter into the picture. For instance, when feeding an amount of glass sufficient to form a gallon jug, obviously the mold charge will be relatively large and in this particular situation, if the viscosity of the glass is below log 4, it would be extremely difficult to gob-feed a forming machine. With the foregoing background and information, the method and apparatus disclosed herein finds its greatest utility in the formation of glass articles from molten glass which is incapable, due to its viscosity, of being gob-fed to the forming machine.

Thus it can be seen that in order to avoid splattering of glass as it is delivered to the mold 17, it is necessary that the mold be raised into close proximity to the orifice 12 of the feeder 10. This is done by the introduction of fluid under pressure through a pipe 32 which is connected to the lower end of the cylinder 15. Introduction of fluid under pressure to the lower end of the cylinder 15 will raise the piston rod 16 and mold 17 carried thereby to the position shown in dotted line on FIG. 1. When in this position the plunger or needle 11 of the feeder will be raised to open the orifice 12 and permit the flow of glass into the mold 17. With the mold 17 charged with molten glass, fluid under pressure is fed to a pipe 33 which is connected to the upper end of the cylinder 15. This will result in lowering mold 17 to the position shown in full line on FIG. 1. The next sequence in the operation of the device shown in FIG. 1 will be the feeding of fluid under pressure through a pipe 34 connected to the motor 30, thus causing the slide 24 to move the plunger head unto vertical alignment with the lowered mold 17. With the plunger head 25 in position above the mold 17, fluid under pressure will be cycled to the pipe 32 to cause the mold 17 to be raised into pressing relationship with respect to the plunger head 25. After the molten glass has been pressed, fluid pressure is released from the pipe 32 and applied to the pipe 33 to lower the mold. With the mold in its lowered position and having the pressed article contained therein, the table 14 is indexed 90° in a counterclockwise direction, thus bringing the mold 20 into position beneath the feeder 10 and carrying the mold 17 to the position occupied by mold 18 in FIGS. 1 and 2. The forming cycle is repeated with respect to the mold 20 while at the same time the mold 17 and the pressed ware therein, which is located at its 90° indexed position is cooled. After the pressing cycle is completed with respect to the mold 20, the cooling is completed with respect to the mold 17, and the table will again be indexed. After completion of the index, the ware will be removed from the mold 17 and the mold 20 will now be cooled and the mold 19 will now be beneath the feeder 10 preparatory to being loaded.

The pipes 32 and 33 have their feed ends positioned closely together within a block 35 which is fastened to the side of the cylinder 15. Adjacent to and in alignment with the block 35 is a complementary block 36 which contains a pair of passages which are in alignment with the ends of the pipes 32 and 33. The passages within block 36 have a pair of conduits 37 and 38 connected thereto. The block 36 is reciprocated by a motor 39 into and out of engagement with the block 35 and serves as a means for connecting fluid under pressure to the pipes 32 and 33 to effect reciprocation of the mold supporting piston rod 16. The motor 39 is fixed to the base and will remain in the position shown in FIGS. 1 and 2. It is adapted to be operated as successive mold supporting cylinders 15 are moved into loading and pressing position.

At the position of mold 18, FIGS. 1 and 2, provision is made to cool the mold, the details of which will be set forth later with respect to the description of FIG. 7.

Figure 8:
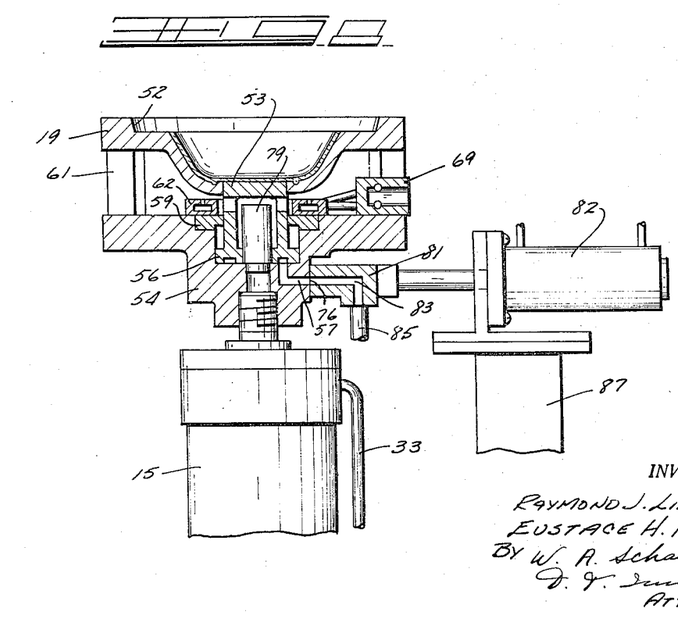
FIG. 8 is a partial cross-sectional view taken at line 8—8 on FIG. 2.

At the position of mold 19, provision is made for lifting the formed ware out of the mold and the details of this mechanism will be later described in connection with FIG. 8.

Figure 3:
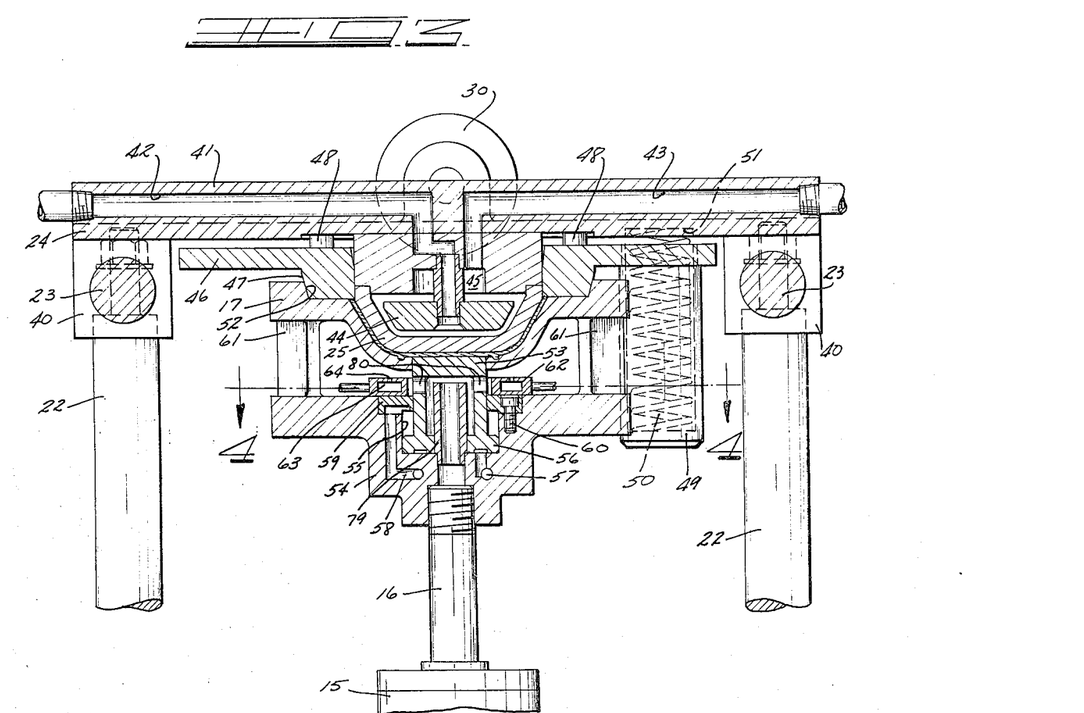
FIG. 3 is a cross-sectional view on an enlarged scale of the press forming apparatus of the invention showing the mold and plunger in glass pressing position.
Figure 4:
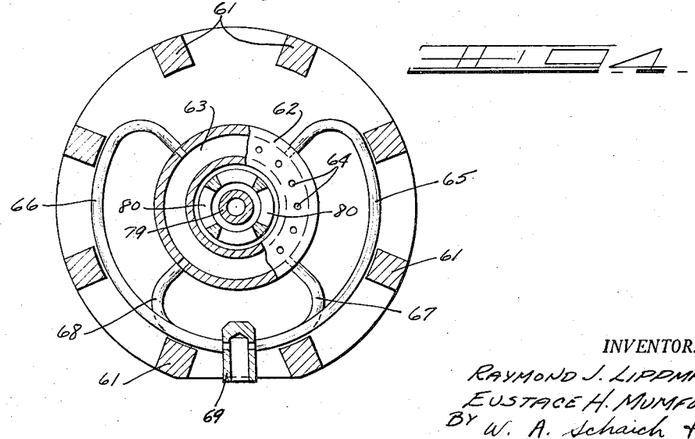
FIG. 4 is a cross-sectional view taken at line 4—4 of FIG. 3.
Figure 5:
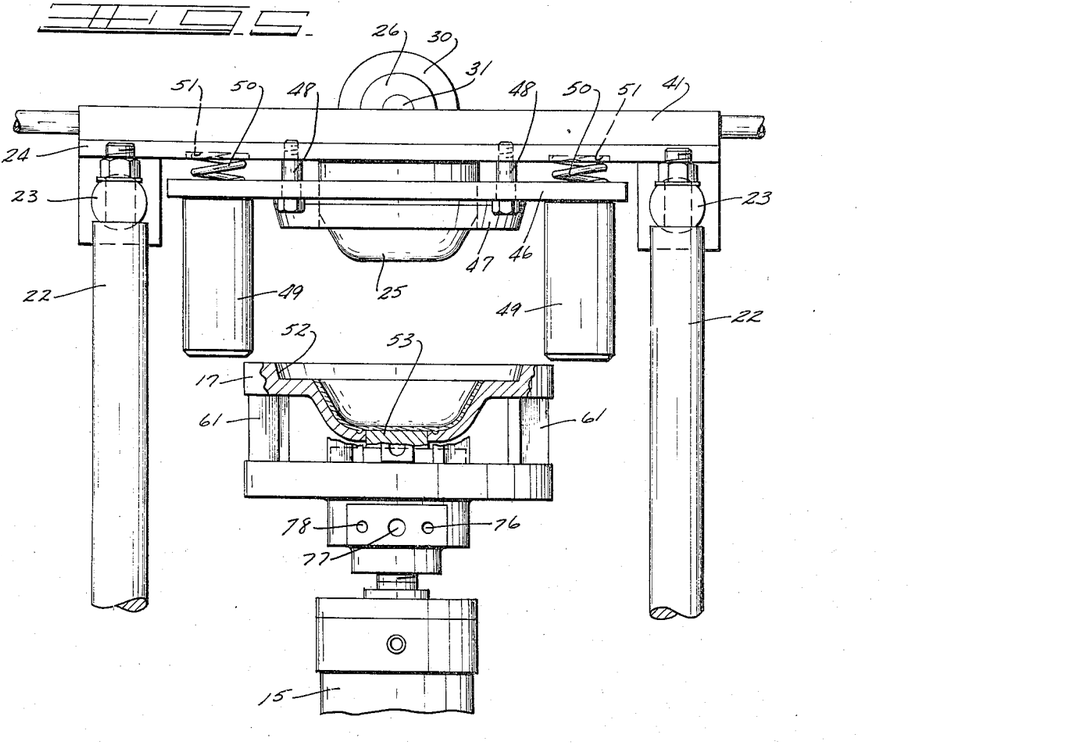
FIG. 5 is an elevational view of the press forming apparatus of the invention with the mold in retracted position with respect to the plunger.

With particular reference to FIGS. 3–5, the details of the plunger mechanism will now be described. The plunger support or slide 24 has a pair of bearing blocks 40 extending along opposite sides thereof which are adapted to contain roller bearings to assist in the movement of the support relative to the guide rails 23. The support 24 carries a manifold block 41 on the top surface thereof which extends substantially the full width thereof. The block 41 has passages 42 and 43 therein through which cooling air is circulated to the inside of the plunger head 25 and exhausted therefrom.

As best shown in FIG. 3, cooling air is supplied through the passage 42 which is connected to the center of a baffle 44. The baffle 44 has an external configuration closely approximating the inner configuration of the hollow plunger head 25 and serves to distribute the cooling medium over the entire inner surface of the plunger head in a more or less symmetrical manner. Exhaust from the interior of the plunger head 25 is accomplished by connection of the exhaust passage 43 to an annular chamber 45 which is in communication with the interior of the head 25. Thus, it can be seen that efficient cooling of the plunger head is accomplished by the continuous flow of cooling medium through the interior of the head. The plunger head 25 extends through an annular plate 46 which has a downwardly and inwardly tapering lower outer surface 47 adapted to seat within a complementary tapered portion 52 of the mold during the pressing operation. The plate 46 is connected to the plunger support 24 by means of a plurality of bolts 48. The bolts 48 are adapted to loosely retain the plate 46 in surrounding relationship with respect to the plunger head 25. The plate 46 has a pair of diametrically disposed, downwardly extending, cylinders 49 connected to the under surface thereof. Each cylinder carries a helical spring 50 therein which seats on the bottom of the cylinder at one end and has its top end seated within recesses 51 formed in the under surface of the support 24. In extended position, the springs 50 remain under slight compression so as to maintain the plate 46 spaced from the plunger support 24 to the extent permitted by the bolts 48.

When the mold, for example mold 17, is raised into glass pressing position with respect to the plunger head 25, the tapered portion 47 of the plate 46 will seat within the complementary tapered recess 52 formed in the upper surface of the mold 17. Continued upward movement of the mold 17 will move the plate 46 relative to the stationary plunger head 25 to complete the pressing of the glass. Upon retraction of the mold 17 away from the plunger head, the plate 46, with its tapered portion 47, will remain seated against the mold 17 by the force of the springs 50 until the plate 46 is moved downwardly to the extent of bolts 48. In this manner, clean stripping of the plunger from the formed glass is assured, as the portion 47 of the plate 46 will hold the glass down within the mold until the plunger is completely free of the glass.

As best shown in FIGS. 3–5, the mold 17 is formed in two parts with a circular plug portion 53 located in the center thereof. The mold 17, as previously described, is mounted on the upper end of a piston rod 16 with the particular mounting as shown in FIGS. 3, 5 and 7. The rod 16 is threaded into a flanged fitting or mold mounting base 54 which has a central recess 55 therein within which the lower portion 56 of the plug 53 is received. The recess 55 serves as a cylinder within which the enlarged lower portion 56 of the plug is adapted to slide and operate in the manner of a piston. A passage 57, formed in the fitting 54, opens into the recess 55 at the bottom thereof below the enlarged portion 56 of the plug 53. Introduction of fluid under pressure to the passage 58 will raise the plug 53. A second passage 58 has its inner end opening into the recess 55 above the portion 56 of the plug 53 and introduction of fluid under pressure to the passage 58 will retract the plug and move it to the position shown in FIGS. 3 and 7. An annular plate 59, fixed to the fitting 53 by any suitable means, for example, a bolt 60, serves to close off the top of the recess 55 and the plug 56 extends therethrough.

This plug 53 is used as a knock out or bottom plate which is raised after pressing and cooling of the ware is completed to assist in removing the ware from the main mold body 17.

The main mold body, as shown in FIGS. 3, 4, 5 and 7 is mounted above the flanged fitting 54 and is supported in this position by means of a plurality of rectangular posts 61. The upper surface of the flanged fitting 54 serves as a support for an annular manifold 62 having a passage 63 therein. The manifold 62 surrounds the plug 53 with its internal diameter slightly larger than the plug 53. The annular manifold 62 has a plurality of openings 64 formed in its upper surface. These openings describe a circle which surrounds the plug 53 and with the introduction of cooling air to the interior of the manifold 62 the openings serve as directing nozzles for insuring symmetrical impingement cooling to the under surface of the main mold body 17. In order to insure that all of the openings 64 are supplied with substantially the same amount of coolant under pressure, four conduits 65-68 are connected to the manifold 62 at circumferentially spaced points thereabout. The opposite ends of the conduits 65-68 are connected to a hollow connector 69. Thus, it can be seen that the introduction of air under pressure to the interior of the connector 69 will result in a flow of air to circumferentially spaced points of the annual manifold 62 and deliver cooling air through the openings 64 to cause impingement of the cooling air on the under surface of the mold body 18.

As previously pointed out, the mold itself is not cooled until after the pressing operation is completed and the table indexed 90°. At this indexed position, a pair of motors 70 and 71 (see FIG. 7) are actuated to move a pair of connector fittings 72 and 73 into engagement with the side of the mold.

Figure 2:
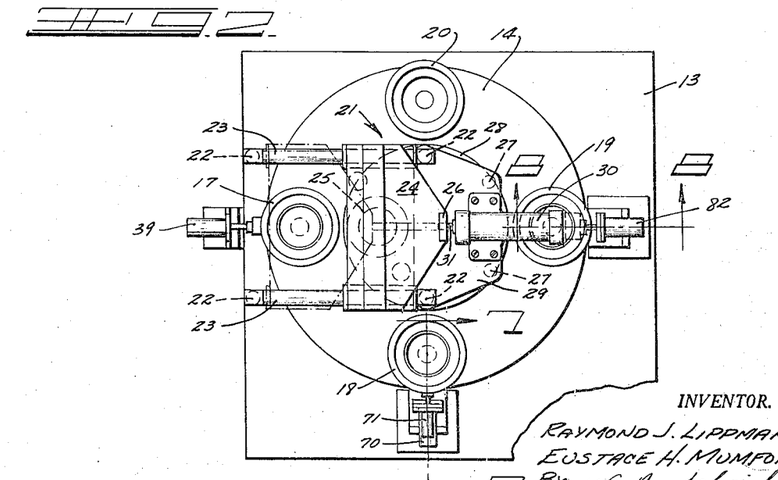
FIG. 2 is a plan view of the forming apparatus of FIG. 1.
Figure 7:
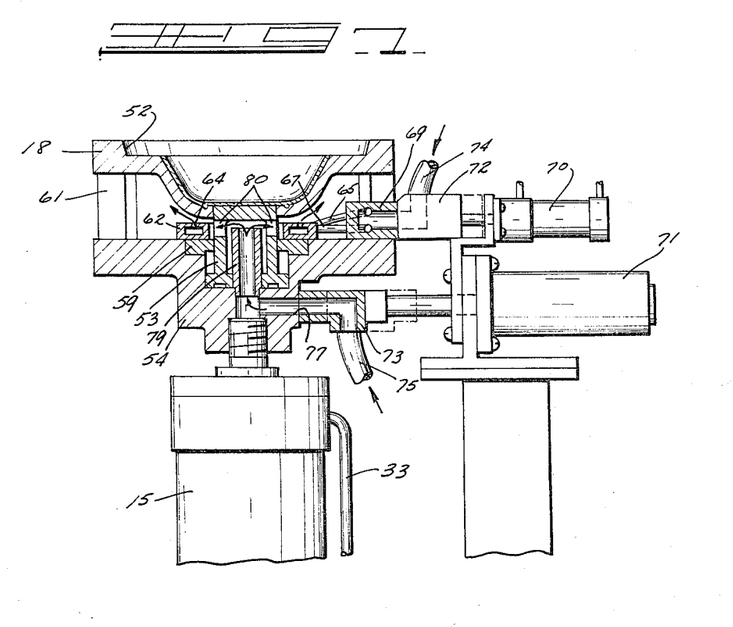
FIG. 7 is a partial cross-sectional view taken at line 7—7 on FIG. 2.

For purposes of illustration, the mold has been designated in FIG. 7 as mold 18 inasmuch as this is the mold of FIGS. 1 and 2 which is positioned at the station where the cooling takes place. The fittings 72 and 73 have conduits 74 and 75 connected thereto which, in turn, are connected to a suitable source of air under pressure. The fitting 72 when moved into abutting relationship with the connector 69 will deliver cooling air under pressure to the manifold 62. The fitting 73 has a single passage therethrough which communicates with a center opening 77 in the mold mounting base 54. The flanged fitting or mounting base 54 actually has three exposed openings 76-78 along the milled face thereof with the openings 76 and 78 being connected to the passages 57 and 58 respectively. The center opening 77 extends into the center of the flanged fitting 54 and communicates with a hollow cylindrical member 79 extending into the interior of the plug 53. In this manner, means are provided for cooling the under surface of the glass contacting face of the plug 53. The cooling air is vented from the plug 53 through side openings 80 formed therein just below the glass contacting surface of the plug.

With specific reference to FIG. 8, the mold 19 is shown positioned at what is termed the takeout station, and the manner of applying fluid under pressure to raise the plug 53 will be described. As has been previously described, the flanged fitting 54 has a milled face in which there are three exposed openings 76, 77 and 78. Two of these openings, 76 and 78, communicate with the passages 57 and 58. The passage 57 is connected to the recess 55 beneath the lower end of the plug 53 while the passage 58 opens into the recess 55 above the enlarged end 56 of the plug 53. When the mold is indexed to the takeout station, a connector 81, carried by the piston rod of a fluid motor 82, will be in horizontal alignment with the openings 76 and 78. The connector 81 has two complementary passages 83 and 84 therethrough which coincide with the openings 76 and 78 respectively. The passages 83 and 84 are supplied through conduits 85 and 86 connected thereto. The motor 82 is mounted on a pedestal 87, which in turn, is fixed to the base 13. The motor is adapted to be actuated after index of the turret is completed to place the connector 81 into position to connect the passages therein to the complementary passages formed in the flanged fitting 54. Thus, it can be seen that the plug 53 will be raised to assist releasing the formed ware from the mold and then retracted after removal of the ware into position for receiving another charge of glass.

Figure 6:
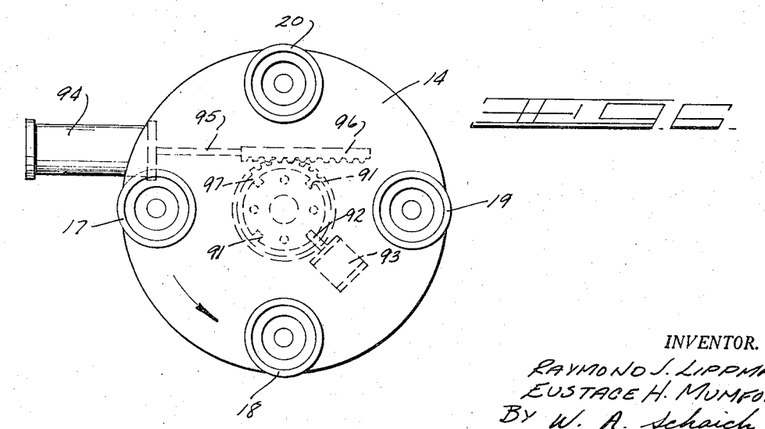
FIG. 6 is a schematic plan view of the mold carrying table and the drive therefor.

With particular reference to FIG. 9, there is shown, in somewhat schematic form, an arrangement for indexing the turret or table 14 which supports the mold carrying cylinders 15. The table 14 rests on a portion of the base 13 with a plurality of bearings 88 positioned therebetween to permit easy rotation of the turret with respect to the base 13. The center of the table 14 has a downwardly extending shaft 89 formed integral therewith. At its lower end the shaft 89 carries a circular plate or disc 90, with the plate having four notches 91 formed in its periphery. These notches are adapted to be engaged by a locking detent 92 which is projected by a hydraulic piston motor 93 into the notch 91 formed in the plate 90. As shown in FIG. 6, the plate is provided with four of these recesses or notches 91 spaced circumferentially about the disc periphery and equal in spacing and number to the molds carried by the table 14.

The means for rotating the table 14 comprises a hydraulic piston motor 94. The piston rod 95 of the motor is connected to a rack 96 which runs in mesh with a gear 97 mounted for rotation about the axis of the turret shaft 89. The operating connection between the gear 97 and shaft 89 includes the disc 90, which is fixed to the shaft 89 and an indexing pin 98. During the rearward stroke of the rack 96 toward the motor 94, the indexing pin 98 is in a lowered position disconnected from the gear 97 so that the gear is rotated idly and the mold table remains at rest. The indexing pin is then lifted by the operation of a hydraulic motor 99 to connect the mold table for rotation during the forward stroke of the rack 96. The indexing movement of the mold table is through an angle of 90°. A means for connecting and disconnecting the indexing pin 98 to and from the gear 97 includes a vertical shaft 100 which is the piston shaft of the motor 99. Keyed to the upper end of the shaft 100 is a circular cam track 101 having an annular recess 102 extending about its periphery and within which a roller 103 is adapted to run. The roller 103 is connected to the lower end of the indexing pin 98.

The hydraulic system for indexing the turret or table and controlling its movements, includes a spool valve 104 actuated by a cam 105. The cam is mounted on a drive shaft 106 which may be driven by a suitable constant speed motor. The spool valve 104 is reciprocated within a valve body 107 which has a fluid pressure inlet 108 and two exhaust outlets 109 and 110. With the valve in the position shown in FIG. 9, fluid under pressure from the inlet 108 will pass through a conduit 111 to the motor 94 and through branch conduits 112 and 113, which are connected, respectively, to the motors 93 and 99. The motor 99 will insure that the indexing pin 98 is seated within the recess in gear 97 and the motor 93 will be actuated to disconnect the locking detent from the plate 90. Upon rotation of the cam 105, through 180°, the valve 104 will move to the right, thus connecting the conduit 111 and its branch conduits 112 and 113 to the exhaust outlet 110. At the same time, the pressure inlet 108 will be connected to the opposite ends of the motors 93, 94 and 99 by means of a conduit 114 and branch conduits 115 and 116. Movement of the valve to the right will thus cause the detent 92 to be seated in the notch 91 of the plate 90 and the pin 98 will be retracted from the gear 97 and the motor 94 will operate to move the rack to the right, thus rotating the gear 97 through a 90° arc preparatory to being reconnected by the pin 98 for driving the turret through a successive 90° arc. In this manner the turret 14 is indexed in a step-wise fashion so as to bring the molds into proper position for the forming, cooling and takeout operations to be carried out in their proper sequence.

Figure 10:
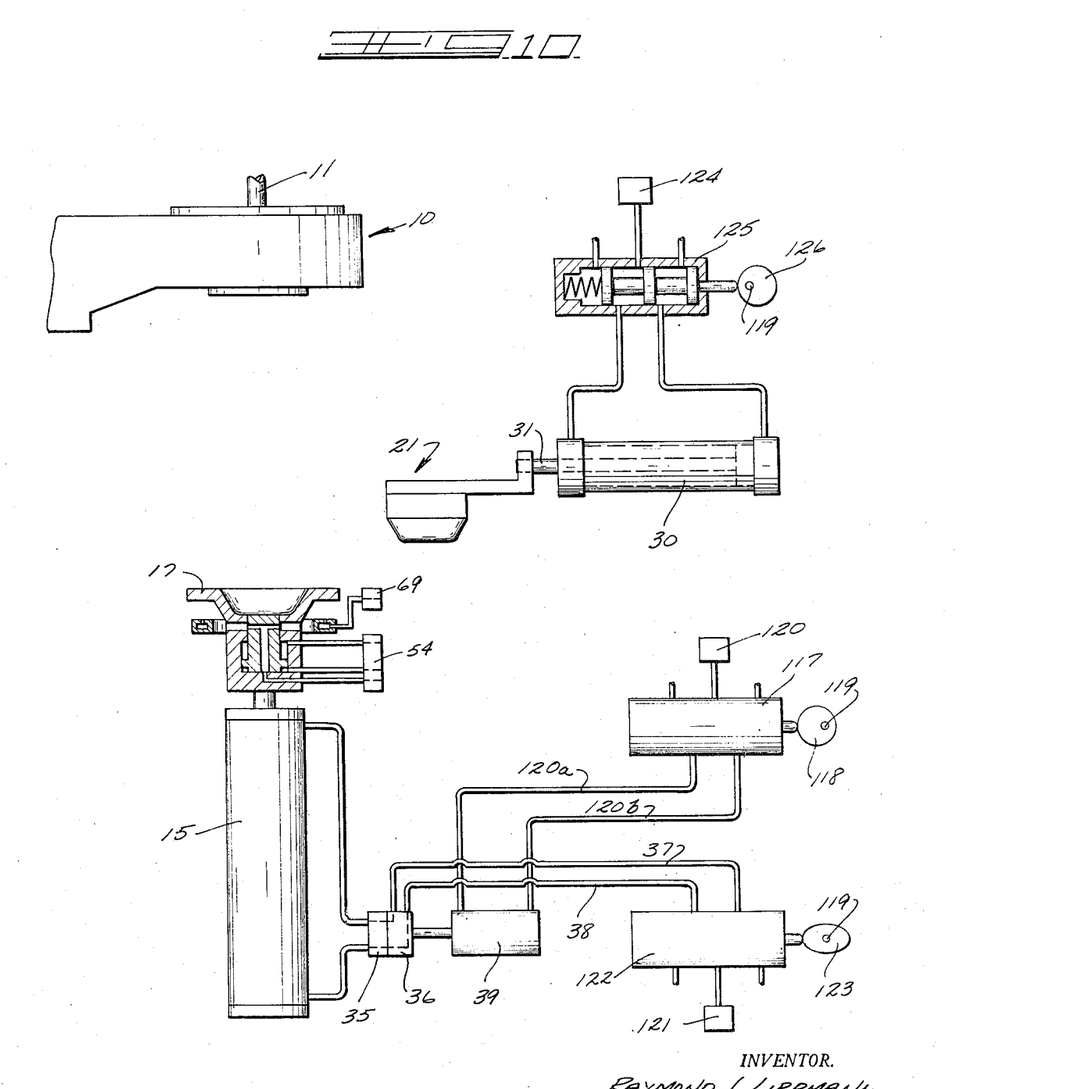
FIG. 10 is a schematic, fluid circuit diagram of the apparatus of FIGS. 1 to 8, at the loading and pressing station.
Figure 11:
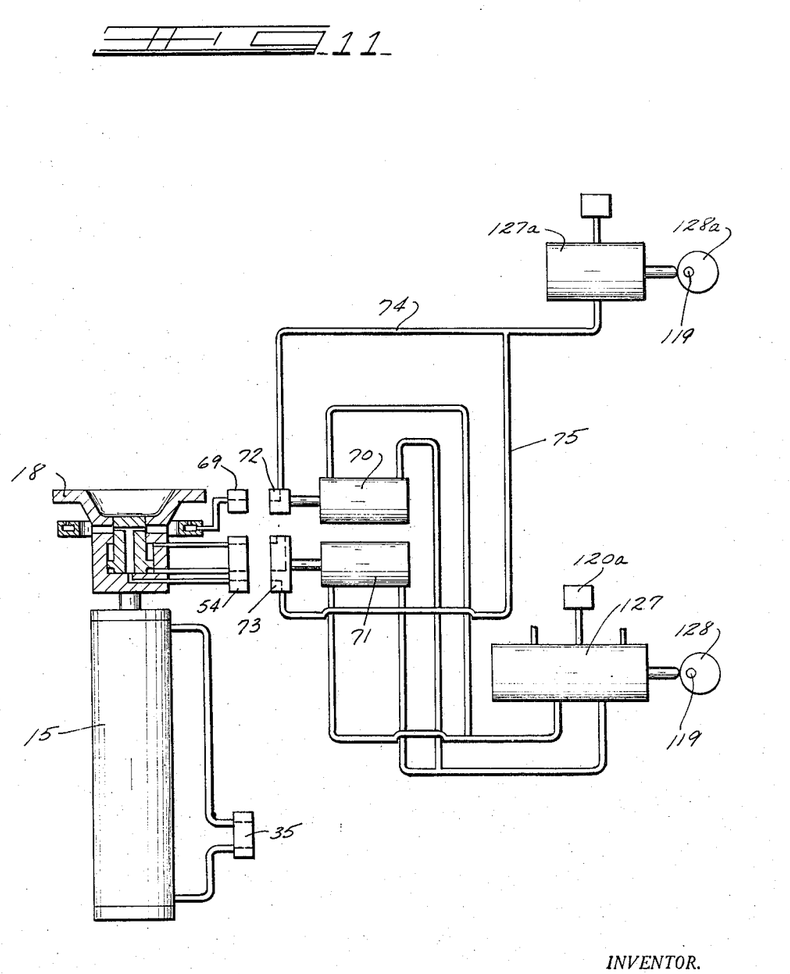
FIG. 11 is a schematic, fluid circuit diagram of the apparatus of FIGS. 1–8, at the cooling station.
Figure 12:
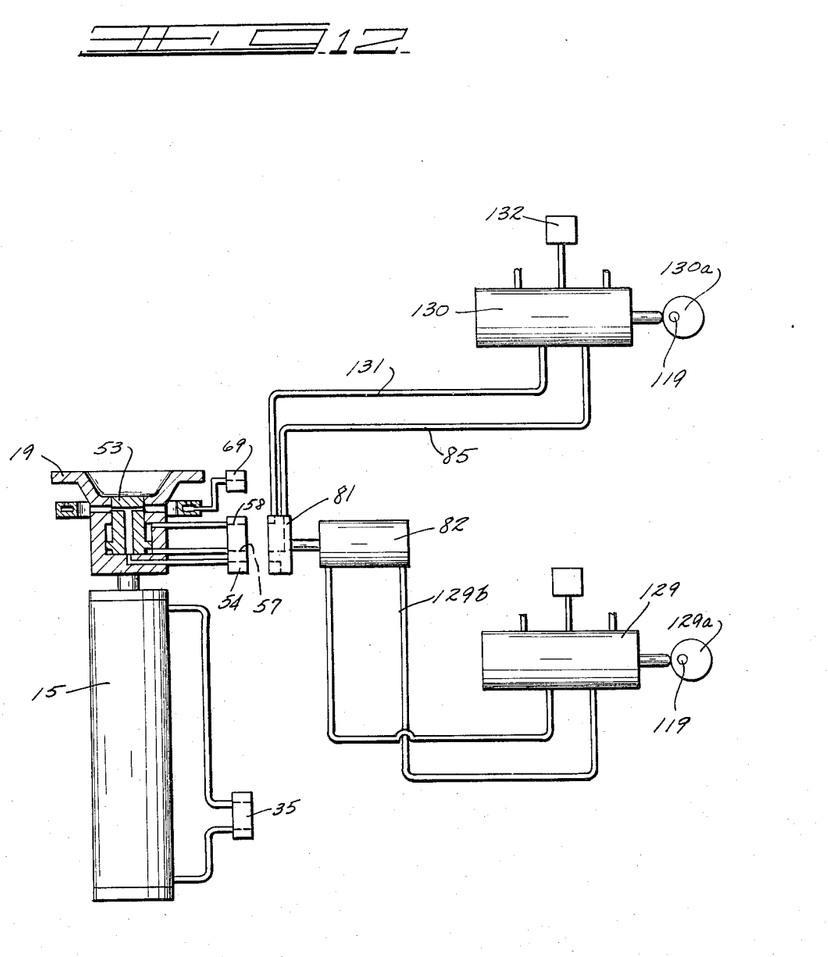
FIG. 12 is a schematic, fluid circuit diagram of the apparatus of FIGS. 1–8 at the ware removal station.

Referring specifically to FIGS. 10–12, the fluid control circuits for sequentially operating the motors 39, 70, 71 and 82 will be described.

The motor 39, which is located adjacent the position of the mold 17 of FIG. 2, is controlled in its operation by the reciprocation of a spool valve 117. Movement of the valve is controlled by the position of a cam 118 which is connected to a drive shaft 119. The drive shaft 119 is driven by a constant speed motor in synchronism with the drive of the drive shaft 106, referred to above in the description of the operation of the drive mechanism of FIG. 9. As can readily be seen, shifting of the spool valve 117 by the cam 118 will deliver fluid under pressure from a source 120, alternately to the two lines 120a, and 120b to effect reciprocation of the motor 39 and consequently the block or fitting 36. The block or fitting 36, which is moved into engagement with the block 35 at the pressing station (see FIG. 10), is supplied with oil under pressure from a chamber 121 connected to the inlet of a spool vale 122. The two conduits 37 and 38 will thus be alternately supplied with fluid under pressure from the chamber 121 by the shifting of the spool valve 122 under the control of a double lobed cam 123. The cam 123 may also be connected to the drive shaft 119 and since the cam has two lobes, the spool valve 122 will be reciprocated twice for each single reciprocation of the spool valve 117. This is necessary from the standpoint that the cylinder 15, which is located at the pressing station, must be actuated to raise the mold into loading position, then be retracted to a position beneath the travel of the plunger. After the plunger is moved into axial alignment with the mold, the mold must again be raised to press the charge of glass contained therein and the mold again retracted before the next index of the table. As previously pointed out, the plunger mechanism 21 is reciprocated by motor 30 through introduction of fluid pressure sequentially to the ends of the motor 30. The plunger activating fluid is supplied from a source 124 connected to the inlet of a spool valve 125 and reciprocation of the spool valve is under the control of cam 126 which in turn may be driven or mounted on the shaft 119, common to the drive shaft for the cams 118 and 123.

Turning now to FIG. 11, the control systems necessary for supplying the physical connections and cooling fluid supply to the mold 18 when at the cooling position will be described.

The motors 70 and 71 are controlled in their operation by the reciprocation of a spool valve 127. The spool valve 127 is operated by a cam 128 which also is connected to the common drive shaft 119. As can readily be seen, reciprocation of the spool valve 127 will provide fluid under pressure from chamber 120a alternately to opposite ends of the motors 70 and 71. Thus, it can be seen that the motors 70 and 71 are actuated to provide connection and disconnection of fittings 72 and 73 with the connector 69 and flanged fitting 54 respectively. A source of air or other cooling fluid under pressure is supplied to a spool valve 127a which is shiftable by cam 128a mounted on the common drive shaft 119, it being understood that the spool valve 127a is nothing more than a two-way valve permitting delivery of air under pressure to the delivery conduits 74 and 75 connected to the fittings 72 and 73 respectively. In this manner the connection for the cooling air to the mold 18 is controlled in its time sequence by the cam 128 and the shutting on and off of air being used as the coolant is under the control of a cam 128a. As previously stated, this cooling takes place when the mold is at the second station or at the position occupied by the mold 18 in FIG. 2.

While the cooling operation is taking place at the mold 18 and the pressing operation is being carried out at mold 17, the mold 19 is being unloaded (see FIG. 12). As previously pointed out, the motor 82 will move the connector 81 into engagement with the flanged fitting 54 under the control of a four-way spool valve 129. This spool valve, which is identical to previously described valves 127, 117 and 125, is under the control of a cam 129a, which in turn may be mounted on the common drive shaft 119. Rotation of the cam 129a through 180° will result in shifting of the spool valve to deliver fluid under pressure to the conduit 129b connected to the rearward end of the motor 82 and will result in moving the connector 81 into engagement with the flanged fitting 54, as shown in FIG. 8. With the motor thus actuated, a second spool valve 130 will be actuated by a cam 130a to deliver fluid under pressure from a source 132 to conduit 85 which is in communication with the passage 57 and will result in causing the plug 53 to be moved upward and in turn raise the ware out of the mold body. With the finished ware raised, it may be conveniently lifted from the mold 19. The plug 53 is returned to its down position by movement of the spool valve 130 to the position shown in FIG. 12 which will then permit fluid under pressure from the valve 130 to pass through a conduit 131 which is in communication with the passage 58 in the flanged fitting 54. As previously stated, the spool valve 130 is shifted by a cam 130a which may be mounted on and driven by the common shaft 119.

Thus, it can be seen that applicants have provided a method and apparatus for forming glass articles from glass which is in an extremely fluid condition at the time the glass is delivered to the mold and the mold charge is prevented from splattering out of the mold during loading and is prevented from moving relative to the mold except under the influence of the pressing plunger.

Various modifications may be resorted to within the spirit and scope of the appended claims.

We claim:
1. The method of press forming objects from molten glass having a relatively low viscosity, comprising the steps of moving a mold into close proximity to the discharge orifice of a container holding said molten glass, flowing a predetermined charge of said glass from said container into said mold, lowering said charged mold vertically downward, moving a plunger into vertical alignment above said mold, relatively moving said charged mold and plunger vertically into pressing relationship, cooling the charge while being pressed, lowering said mold away from said plunger and removing the pressed article from said mold.

2. The method of press forming objects from molten glass having a relatively low viscosity, comprising the steps of raising a mold into close proximity to the discharge orifice of a container holding said molten glass, flowing a stream of predetermined volume of said glass into said mold from said container, lowering said charged mold, moving a plunger into vertical alignment above said mold, raising said charged mold into pressing relationship with respect to said plunger, cooling the charge while being pressed, again lowering said mold away from said plunger and removing the pressed article from said mold.

3. The method of press forming shallow articles from molten glass of relatively low viscosity comprising the steps of raising a first mold into close proximity to the discharge orifice of a container holding said molten glass, flowing a predetermined charge of said glass into said first mold from said container, lowering said charged first mold vertically downward, moving a plunger into vertical alignment with and above said first mold, raising said charged mold into pressing relationship with respect to said plunger, cooling the charge while being pressed, again lowering said mold away from said plunger and moving said first mold to a laterally displaced position, simultaneously therewith moving a second mold into alignment with said discharge orifice, charging the second mold and forming an article in the second mold, cooling said second mold while the charge is being formed, then moving the first mold to a third laterally displaced position, removing the completely formed and cooled article from the first mold at the third position, and repeating the cycle in succession.

4. Apparatus for forming shallow articles from a molten glass of relatively low viscosity comprising a base, a circular table, means for supporting said table for rotation relative to said base with a portion of the periphery of said table being positioned below a supply of molten glass, a plurality of vertical, reciprocatory rods mounted on said table and circumferentially spaced thereon, a forming mold mounted on each rod, a generally convex shaping tool, means for mounting said tool on said base, spaced vertically thereabove, said tool mounting means including means for guiding said tool for lateral movement into and out of vertical alignment with respect to one of said molds, means for indexing said table to bring successive molds into alignment with the path of travel of said shaping tool, a supply of fluid under pressure, means for connecting said fluid pressure source to the reciprocatory rod positioned below the source of molten glass, valve means interposed between said pressure source and said connecting means, timer means for actuating said valve in sequence to actuate said reciprocatory rod to raise the mold into close proximity to the source of glass, retract the mold and raise the mold again into pressing relationship with respect to the shaping tool, and means for cooling said mold while the mold and tool are in pressing relationship.

5. The apparatus as defined in claim 4, wherein said shaping tool is hollow, a source of coolant, means for connecting said source to said shaping tool, and means within said tool for directing coolant into contact with the interior surface of said shaping tool in a symmetrical manner.

6. The apparatus as defined in claim 5, further comprising a second coolant directing means mounted below each mold for directing coolant against the outer wall of said mold, and means for connecting said second coolant directing means to said source of coolant.

7. Apparatus for forming shallow articles from a molten glass of relatively low viscosity comprising a base, a circular table, means for supporting said table for rotation relative to said base with a portion of the periphery of said table being positioned below a supply of molten glass, a plurality of vertical, fluid motors mounted on said table and circumferentially spaced thereon, a forming mold mounted on each motor, a generally convex shaping tool, means for mounting said tool on said base, and spaced vertically thereabove, said tool mounting means including means for laterally moving said tool into and out of vertical alignment with respect to one of said molds, means for indexing said table to bring successive molds into alignment with the path of travel of said shaping tool, a supply of fluid under pressure, means for connecting said fluid pressure source to the fluid motor positioned below the source of molten glass, valve means interposed between said pressure source and said connecting means, timer means for actuating said valve in sequence to actuate said motor to raise the mold into close proximity to the source of glass, retract the mold and raise the mold again into pressing relationship with respect to the shaping tool, and means for cooling said mold while the mold and tool are in pressing relationship.

8. The apparatus as defined in claim 7, wherein said shaping tool is hollow, a source of coolant, means connecting said source to said shaping tool, and means within said tool for directing coolant into contact with the interior surface of said shaping tool in a symmetrical manner.

9. The apparatus as defined in claim 7, wherein said shaping tool is hollow, a source of coolant, means connecting said source to said shaping tool, means within said tool for directing coolant into contact with the interior surface of said shaping tool in a symmetrical manner, annular coolant directing means mounted below said mold for directing coolant against the exterior surface of the mold and cam operated means connecting said source of coolant to said shaping tool and coolant directing means.

10. Apparatus for forming shallow articles from a molten glass of relatively low viscosity comprising a base, a container for molten glass mounted above said base, said container having a discharge orifice, a vertical reciprocatory rod mounted on said base in vertical alignment with said orifice, a forming mold supported by said rod, a forming tool having a shaping surface complementary to said mold, timer means for sequentially vertically moving said rod to elevate said mold into close proximity to said discharge orifice to receive a charge of molten glass and to lower the mold after receiving the charge, then to move said tool into vertical alignment with the lowered mold, finally to elevate the mold into pressing relation with said tool, and means for cooling the charge while being pressed.

References Cited by the Examiner
UNITED STATES PATENTS

| | | | |
|---|---|---|---|
| 612,140 | 10/1898 | Riling | 65—312 |
| 835,613 | 11/1906 | Hayes | 65—312 |
| 1,560,062 | 11/1925 | Kucera | 65—319 X |
| 2,244,809 | 6/1941 | Sloan | 65—308 |
| 2,287,512 | 6/1942 | Cassell | 65—308 |
| 3,024,571 | 3/1962 | Abbott et al. | 65—356 X |
| 3,198,617 | 8/1965 | Denman et al. | 65—223 X |

DONALL H. SYLVESTER, *Primary Examiner.*

A. D. KELLOGG, *Assistant Examiner.*